United States Patent
Mogensen (10) Patent No.: US 12,215,735 B2
(45) Date of Patent: Feb. 4, 2025

(54) COUPLING SYSTEM

(71) Applicant: UNI-TROLL EUROPE APS, Tommerup (DK)

(72) Inventor: Erling Kristen Mogensen, Middelfart (DK)

(73) Assignee: UNI-TROLL EUROPE APS, Tommerup (DK)

( * ) Notice: Subject to any disclaimer, the term of this patent is extended or adjusted under 35 U.S.C. 154(b) by 606 days.

(21) Appl. No.: 17/418,399

(22) PCT Filed: Dec. 20, 2019

(86) PCT No.: PCT/DK2019/050417
§ 371 (c)(1),
(2) Date: Jun. 25, 2021

(87) PCT Pub. No.: WO2020/135910
PCT Pub. Date: Jul. 2, 2020

(65) Prior Publication Data
US 2022/0074440 A1    Mar. 10, 2022

(30) Foreign Application Priority Data
Dec. 28, 2018 (DK) .............................. PA201801081

(51) Int. Cl.
*F16B 7/04* (2006.01)
(52) U.S. Cl.
CPC .................. *F16B 7/042* (2013.01)
(58) Field of Classification Search
CPC ...... B62B 3/002; F16B 7/0406; F16B 7/0413; F16B 7/042; F16B 7/22; F16B 17/004;
(Continued)

(56) References Cited

U.S. PATENT DOCUMENTS

| 599,492 | A | * | 2/1898 | Carter | .................. F16L 13/141 403/283 |
| 1,022,056 | A | * | 4/1912 | Bassick | .............. B60B 33/0002 16/39 |

(Continued)

FOREIGN PATENT DOCUMENTS

| CN | 1832879 A | 9/2006 |
| CN | 202321318 U | 7/2012 |

(Continued)

OTHER PUBLICATIONS

International Preliminary Report on Patentability PCT/DK2019/050417; Feb. 26, 2021; 6 pages.
(Continued)

*Primary Examiner* — Josh Skroupa
*Assistant Examiner* — Kevin J Baynes
(74) *Attorney, Agent, or Firm* — Winthrop & Weinstine, P.A.

(57) ABSTRACT

A system for coupling of units on a substantially rectangular load carrier with four columns arranged in its corners. The system comprises: a unit in the form of a column with a rectangular profile with four side faces; a unit in the form of an anchoring piece (3) with a substantially rectangular cross section with four side faces. The anchoring piece (3) is to be arranged on a corner of the load carrier. The anchoring piece (3) and the column (2) are mutually adapted, so that the column (2) and the anchoring piece (3) can be inserted in a mutually sliding engagement along their longitudinal axes. The anchoring piece (3) and the column comprise side faces with locking parts in the form of at least one cam (4, 5) or an opening (7, 8) complementary thereto, executed in a side face on the column (2) and a side face on the anchoring piece (3), respectively, which opening (7, 8) and cam (4, 5) have mutually adapted locations, so that the opening (7, 8) and
(Continued)

cam (4, 5) engage, when the column (2) and the anchoring piece (3) are inserted into each other.

15 Claims, 8 Drawing Sheets

(58) Field of Classification Search
 CPC ...... F16B 7/105; Y10T 403/49; Y10T 403/55; Y10T 403/557; Y10T 403/7043
 USPC .................................... 403/363; 52/848, 850
 See application file for complete search history.

(56) References Cited

U.S. PATENT DOCUMENTS

| | | | | |
|---|---|---|---|---|
| 3,447,819 A | | 6/1969 | Borsum | |
| 3,778,175 A | * | 12/1973 | Zimmer | E06B 3/9684 52/645 |
| 3,815,966 A | * | 6/1974 | Lyman, Jr. | B62B 3/002 312/351.12 |
| 4,045,104 A | * | 8/1977 | Peterson | A47B 47/03 312/263 |
| 4,620,637 A | | 11/1986 | Karashima | |
| 4,782,637 A | * | 11/1988 | Eriksson | E04B 1/3483 312/263 |
| 5,330,064 A | * | 7/1994 | Hall | A47F 5/135 248/188.8 |
| 5,332,270 A | | 7/1994 | Petty et al. | |
| 5,820,289 A | * | 10/1998 | Kern | H05K 7/183 403/231 |
| 6,209,155 B1 | * | 4/2001 | Epstein | A47C 19/04 5/285 |
| 6,685,379 B2 | * | 2/2004 | Polevoy | F16B 21/09 403/353 |
| 8,398,000 B2 | * | 3/2013 | Gramatte | E01B 25/24 104/106 |
| 9,723,925 B1 | * | 8/2017 | Tsai | A47B 45/00 |
| 10,094,406 B2 | * | 10/2018 | Allen | F16B 7/0413 |
| 11,490,730 B2 | * | 11/2022 | Liss | A47B 47/021 |
| 2004/0189179 A1 | | 9/2004 | Karita et al. | |
| 2005/0155209 A1 | | 7/2005 | Isendam et al. | |

FOREIGN PATENT DOCUMENTS

| | | | | |
|---|---|---|---|---|
| CN | 203601340 U | | 5/2014 | |
| CN | 203920794 U | | 11/2014 | |
| CN | 203958228 U | | 11/2014 | |
| CN | 205820230 U | | 12/2016 | |
| CN | 206781819 U | | 12/2017 | |
| DE | 201 13 832 U1 | | 11/2001 | |
| DE | 102008016950 A1 | | 10/2009 | |
| EP | 0 332 209 A1 | | 9/1989 | |
| FR | 1455850 A | | 5/1966 | |
| GB | 956036 A | * | 4/1964 | ................ F16B 7/22 |
| GB | 979213 A | * | 1/1965 | ................ F16B 7/22 |
| GB | 1569405 A | | 6/1980 | |
| WO | WO-9115314 A1 | * | 10/1991 | ........... F16B 17/004 |
| WO | 2015018166 | | 2/2015 | |
| WO | WO 2017/010883 A2 | | 1/2017 | |

OTHER PUBLICATIONS

International Search Report PCT/DK2019/050417; Jul. 2, 2020; 4 pages.
Written Opinion Of the International Searching Authority PCT/DK2019/050417; Jul. 2, 2020; 6 pages.
Office Action in Chinese Appln. No. 2019800855265, dated Feb. 8, 2023, 21 pages (with English translation).
Search Report in Chinese Appln. No. 2019800855265, mailed on Aug. 17, 2023, 4 pages (with English translation).
Office Action in Australian Appln. No. 2019412444, dated Nov. 26, 2024, 5 pages.

* cited by examiner

COUPLING SYSTEM

This application is a National Phase Application of PCT/DK2019/050417, filed on 20 Dec. 2019, which claims benefit of Application No. PA201801081, filed on 28 Dec. 2018 in Denmark, and which applications are incorporated herein by reference. A claim of priority to all, to the extent appropriate, is made.

BACKGROUND

The present invention relates to a system for coupling of units on a substantially rectangular load carrier with four columns arranged in its corners, which system comprises: a unit in the form of a column with a rectangular profile with four side faces; a unit in the form of an anchoring piece with a substantially rectangular cross section with four side faces, said anchoring piece to be arranged on a corner of the load carrier. The anchoring piece and the column are mutually adapted, so that the column and the anchoring piece can be inserted in a mutually sliding engagement along their longitudinal axes, and the anchoring piece and the column comprise side faces with locking parts in the form of at least one cam or an opening complementary thereto executed in a side face on the column and a side face on the anchoring piece, respectively, which opening and cam have mutually adapted locations, so that the opening and cam engage, when the column and the anchoring piece are inserted into each other.

Load carriers, such as carts for handling of goods, plants, products etc., are widely used in the retail trade, and they are often provided with a set of front wheels and a set of rear wheels mounted on the bottom face of a base frame with vertical columns extending upwards from the corners of the base frame. One or more shelves are arranged to support the load of the cart. The shelves are usually connected to each of the vertical columns by means of hooks arranged in the corners of the shelves. The hooks are configured to engage with slits arranged at suitable intervals in the longitudinal direction of the columns, and the shelves can hereby be mounted or dismounted, moved and/or removed, depending on the situation of use. The shelves being removable also means that the load carriers take up less space during return transport in empty condition.

Such an arragement is disclosed in DE 201 13 832 U1 having a rectangular load carrier with four columns arranged in its corners, showing a temporary connection between the corner posts and a carrier for the shelves in such a way that it is possible to change the vertical distance between the shelves.

Further DE 201 13 832 U1 discloses a pair of lips or tongues for sliding into a corresponding opening and to be supported in vertical direction in one direction only. In the event that the bracket is lifted, it will go out of engagement with the column.

One problem with the load carriers is that the columns should normally also be dismountable to reduce the volume of the load carriers as much as possible during return transport. In prior art load carriers, this takes place by merely lifting the columns out of engagement with the corners of the load carriers, and this particular characteristic of the column/load carrier also means that the columns can simply fall off the load carrier when in use.

In prior art systems for coupling, as is e.g. known from tent poles, flexible buttons are used, which are arranged on the object that is innermost, when two parts are connected. The button is mutually adapted to an opening in the outermost object, so that the springy button slides out locking into the opening, when the two parts are assembled. The actual release of the two parts takes place by a pressure—from outside—on the springy button.

In these systems, the retaining is provided with a springy button to obtain easy separation and assembly.

This intended easy separation is a disadvantage, when the known systems are used for retaining the load carrier's columns in anchoring pieces. The reason is that the load carrier's columns are not only exposed to longitudinal pressure (to which tent poles are preferably exposed), but also to tractive forces, when shelves are mounted or dismounted. Moreover, load carriers are also exposed to bumps, when they are wheeled around, and particularly the combination of tractive forces and bumps have turned out to be unfortunate as columns sometimes—unintentionally—are separated.

From WO 2017/010883 A2 is known a snap-fit connection of a surgical instrument in shape of a steerable invasive instrument. This snap-fit connection is formed by a stopping element, formed by an inwardly bent lip, which is cut out from a second cylindrical element leaving an edge to abut against an edge in an opening in a first cylindrical element. Such a connection merely secures a joint when torsional forces are applied and is not suitable in relation to load carriers since it does not provide a strong joint of the two elements when compressive or tensile forces are applied in a longitudinal direction.

This problem has been remedied by the system comprising a column and an anchoring piece, wherein two cams or two openings are arranged on the one side of the two units (column or anchoring piece), while the two openings or cams complementary thereto are arranged on the other unit, which openings and cams are arranged on the two opposite side faces of each individual unit and preferably symmetrically about the units' longitudinal axes.

By using a cam arranged on the side face instead of a springy button, the necessary flexibility is obtained due to the elasticity of a side face rather than from the button arrangement itself and thereby a very safe coupling is obtained. To a skilled person, it will be evident that a cam can be provided in many ways, including by punching/deflection of material from the side face or simply by adding material to the side face, and the skilled person will also be capable of varying both the geometric configuration and material of the cam and still obtain retaining as explained above, namely primarily by elastic deformation of the material in a side face in the area around the cam and/or the opening adapted to the cam.

In an embodiment, the system comprises a column and an anchoring piece, wherein two cams or two openings are arranged on the one side of the two units (column or anchoring piece), while the two openings or cams complementary thereto are arranged on the other unit, which openings and cams are arranged on the two opposite side faces of each individual unit and symmetrically about the units' longitudinal axes.

By arranging cams and openings symmetrically about the longitudinal axes of the column and the anchoring piece, a safer connection is obtained, as the flexible deformations take place correspondingly symmetrically.

In an embodiment, the system's column and anchoring piece comprise a cam arranged on the inner side of the object that is outermost, when the objects are assembled. This is to avoid projecting parts.

When a column is assembled with an anchoring piece, wherein the parts are constructed, so that the cam is arranged on the inner side of the outermost object, the cam will be impacted by springy forces that impact it against the inner side of the assembly. Thus, the cam will have to be pressed from the inner side and against the outer side of the assembly to separate a column and an anchoring piece that are assembled according to this embodiment. A load carrier in ordinary use will sometimes be impacted by bumps, when it hits various objects, and it will thus be better protected against separation if the load carrier is executed according to this embodiment.

In an embodiment, the system comprises a column and an anchoring piece, wherein the column is executed with a larger circumference than the anchoring piece, so that the inner side of the column slides on the outer side of the anchoring piece, when the parts are assembled.

In an embodiment of this, the column is executed with a cam on the inner side.

In an embodiment, the column comprises two cams executed on the same side face, but displaced along the longitudinal axis of the column.

In an embodiment, the column comprises two cams executed on the inner side of the same side face, but mutually displaced along the longitudinal axis of the column.

In an embodiment, the column comprises four cams executed on the inner sides of the side faces, which cams are executed in pairs on the inner side of the column and arranged, so that two cams are mutually displaced on the inner side of one side face and two cams facing on the inner side of the opposite side face.

In yet another embodiment, the system comprises an anchoring piece, wherein two openings are arranged, so that they engage with two of the cams, the distance of said two openings to the anchoring piece being adapted, so that the end of the anchoring piece abut on two cams concurrently with the two other cams engaging with the two openings.

When the column and the anchoring piece are assembled in this manner, the engagement is very safe.

Other embodiments of the invention will appear from the dependent claims.

In the application, the terms punchings and extractions are used, and they both cover a production method, whereby the material is pressed or extracted, and the material can be entirely removed as is the case for the images of embodiments of the anchoring piece in this application. However, the material can also be extracted, so that it constitutes a cam as seen in the images of embodiments of the column in this application.

In the following, an embodiment of the invention will be explained with reference to the figures, wherein.

Load carriers, such as carts for handling of goods, plants, products etc., are widely used in the retail trade, and they are often provided with a set of front wheels and a set of rear wheels mounted on the bottom face of a base frame with vertical columns, extending upwards from the corners of the base frame. One or more shelves are arranged to support the load of the cart. The shelves are usually connected to each of the vertical columns by means of hooks arranged in the corners of the shelves. The hooks are configured to engage with slits (shown in FIG. 1 with reference numeral 6), arranged at suitable intervals in the longitudinal direction of the columns, and the shelves can hereby be mounted or dismounted, moved and/or removed depending on the situation of use. The shelves being removable also means that the load carriers take up less space during return transport in empty condition.

Figures 1, 1B:
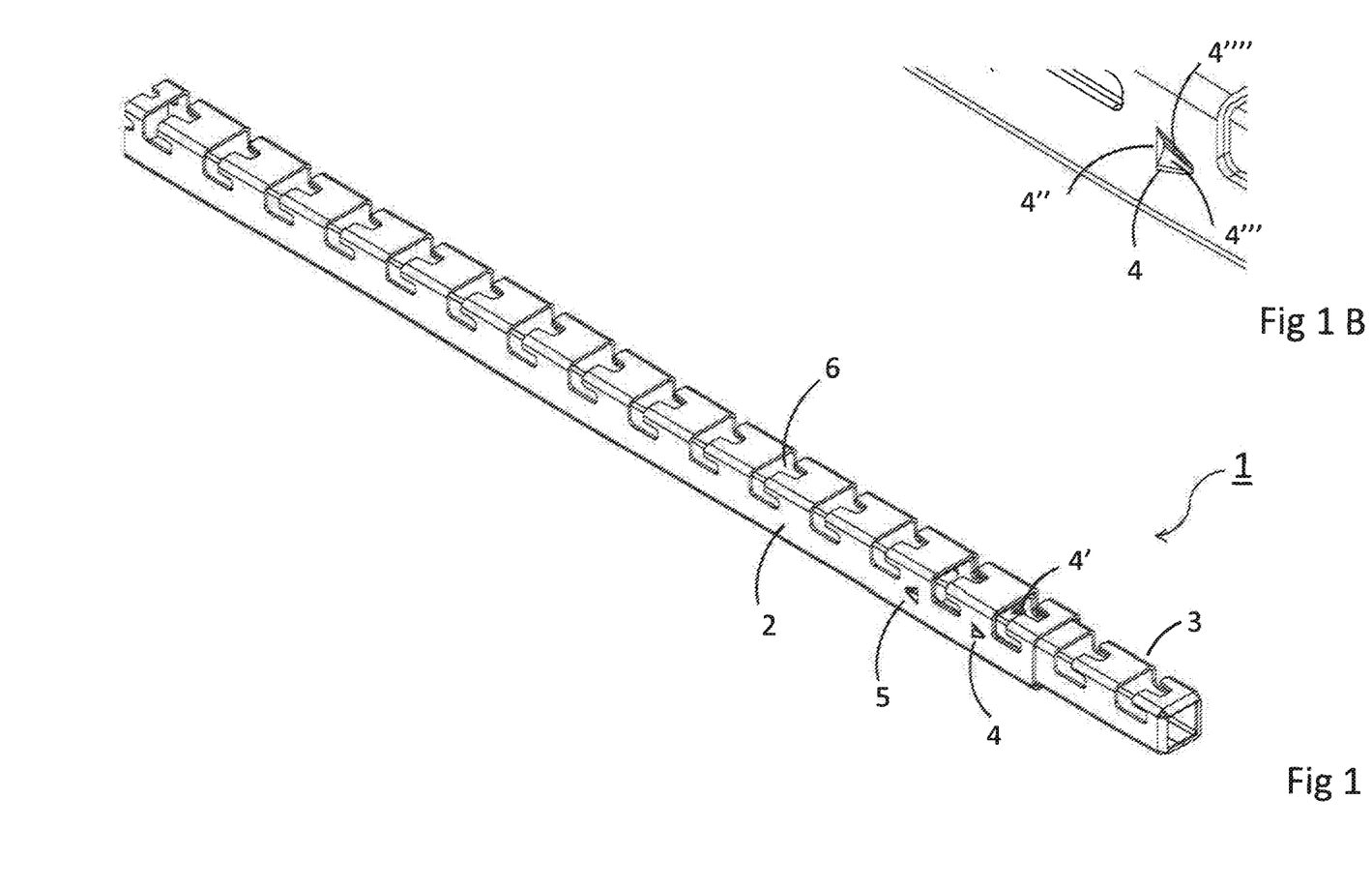
FIG. 1 shows a perspective view of a system according to the invention with an anchoring piece and a column.
Figure 5:
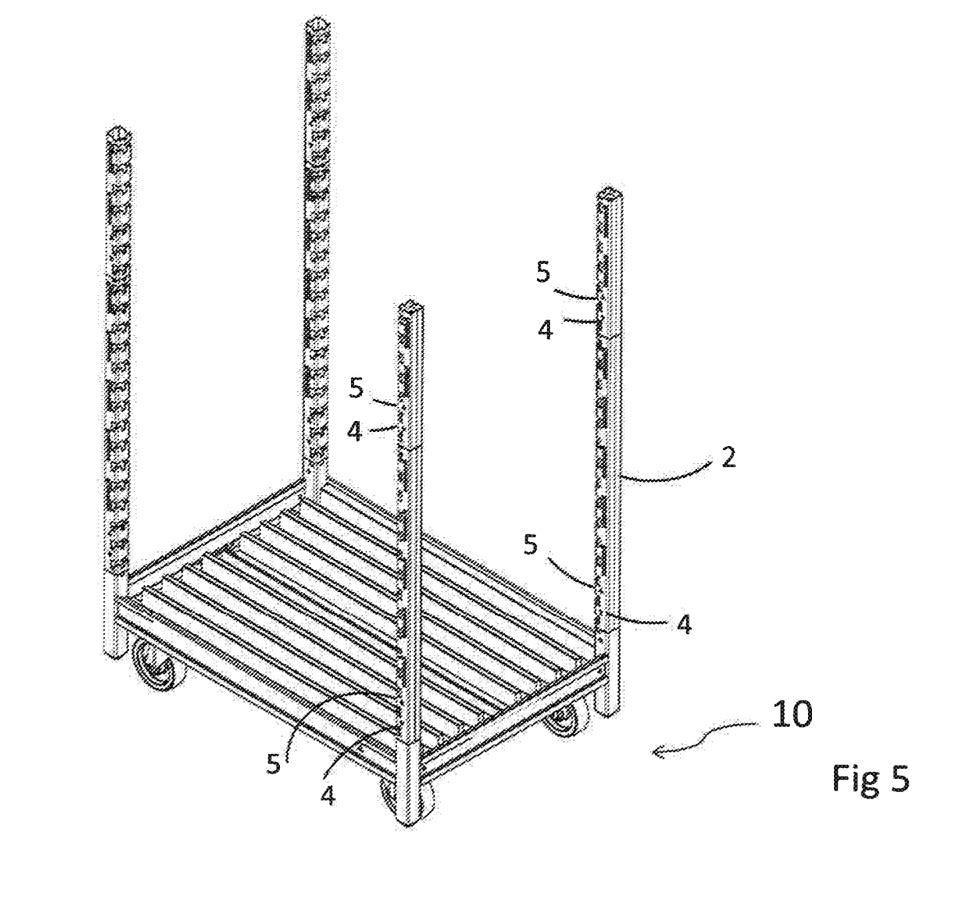
FIG. 5 shows a perspective view of a load carrier with columns.

FIG. 1 shows an embodiment of a system 1 according to the invention for coupling of two units on a substantially rectangular load carrier (shown in FIG. 5) with four identical columns arranged in its corners. The system comprises a column 2 with a rectangular profile with four side faces. The system also comprises an anchoring piece 3. Usually, these anchoring pieces and columns are arranged in the corners of the load carrier (see also FIG. 5). The anchoring piece has the same square or rectangular shape as the column, but is manufactured with a smaller circumference, so that it can slide in and out of the column in its longitudinal direction. Clearly, the anchoring piece and the column can have other geometric shapes than square or rectangular, they can e.g. be round, oval or triangular—the most important thing is that they can engage as indicated.

In the column, there are two outward cams 4 and 5, which are usually executed as punchings in two sides of the column. Furthermore, the column is usually (but not necessarily) executed with two corresponding cams lying in the side face directly opposite.

These punchings (semi-cutout) have usually not removed the material from the column, but have rather caused an extraction of the material, so that it forms a cam on the inner side of the column. In the shown embodiment, the punchings are shown as triangular, but clearly they can have other shapes evident to the skilled person.

The term "semi-cutout" is used in practical mechanical engineering about a punch, for which the material has not been entirely removed (cut out) but has rather been extracted.

In FIG. 1B, at the top in FIG. 1, such a punching 4 is shown at a slightly higher level of detail, and here it can be seen faintly that two faces 4''' and 4'''' are formed from the sides of the column, as they are bent and drawn inwards towards the columns longitudinal central axis. One of these faces 4'''' is seen at the bottom of the punching, and the second one 4'''' can be seen faintly at the top of the punching. At the left side of the punching (as shown in FIG. 1B), an opening 4'' can be seen vaguely.

The two punchings 4 and 5 shown in FIG. 1 are usually identical, but are shaped as the reflections of each other around a surface plane perpendicular on the longitudinal axis of the column. The punching with reference numeral 5 thus has a corresponding opening lying at its right side. The two bent faces (4''' and 4'''') mentioned above contribute to the cams/punchings constituting an inflexible part. The faces 4''' and 4'''' have partly been strain-hardened at the forming of the semi-cutout, and their geometric form and anchoring are partly strengthening, especially against pressure forces applied against the innermost point of the semi-cutout. As outlined above, the faces 4''' and 4'''' are pressed inwards against the longitudinal axis of the column, and the functionality of these inward "protrusions" is that they are to form a so-called cam or a protrusion, which can be accommodated by the openings 7, 8 provided for the purpose in an anchoring piece as shown in FIGS. 2 and 3.

Figure 2:
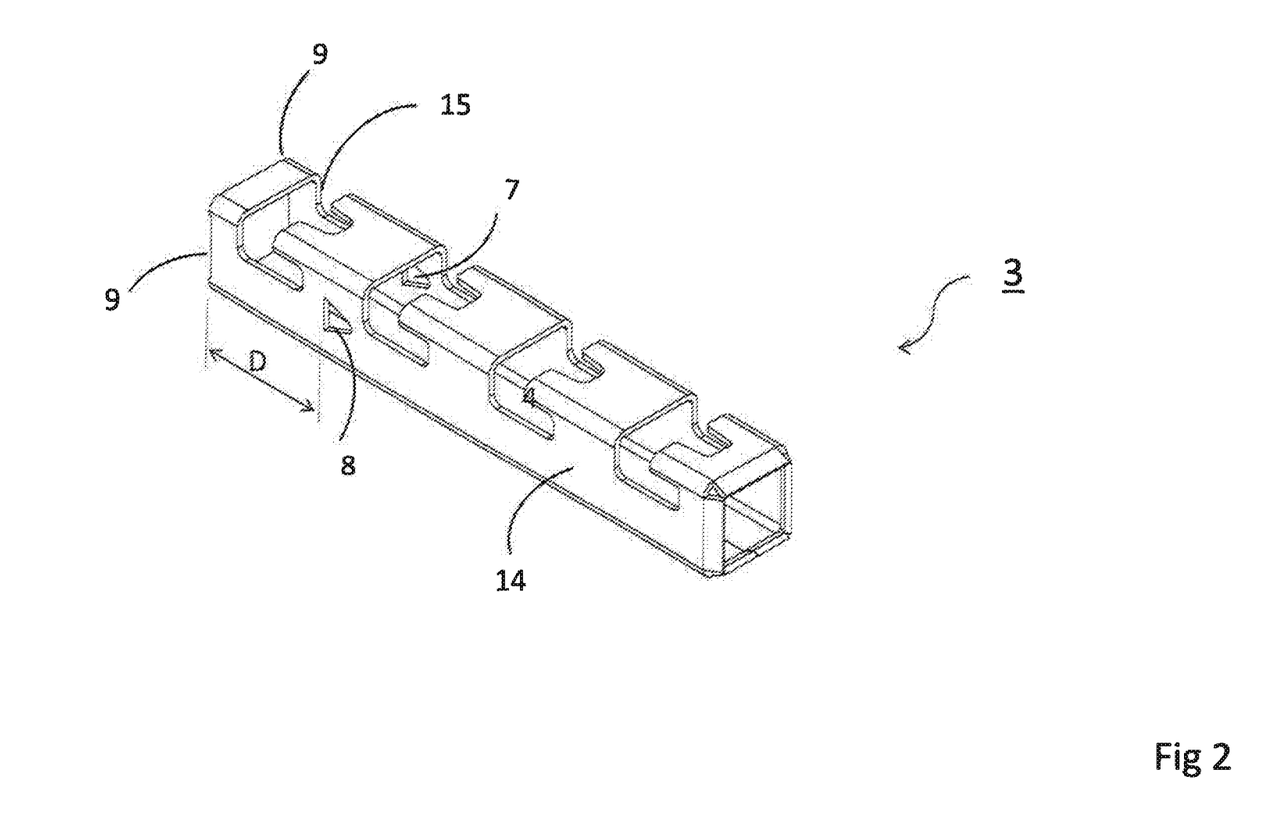
FIG. 2 shows a perspective view of an anchoring piece.
Figure 3:
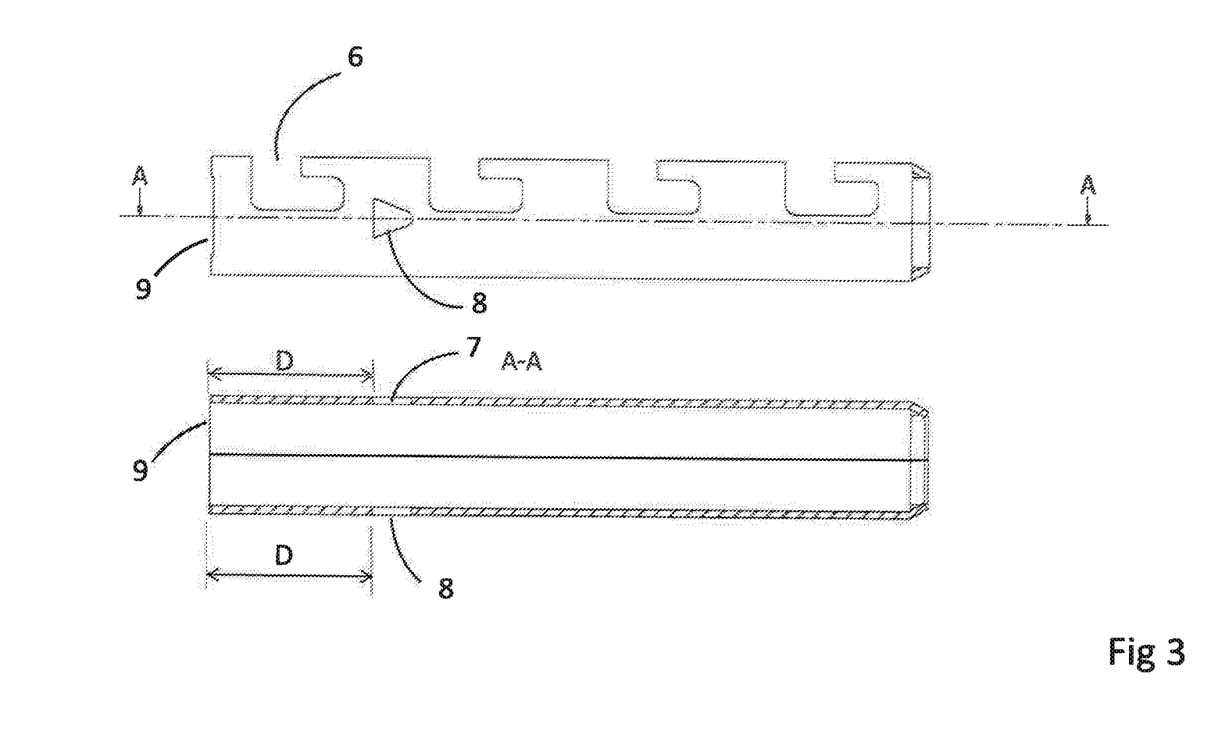
FIG. 3 shows a side view of an anchoring piece and a sectional view hereof.

While FIG. 2 shows a higher level of detail of an anchoring piece 3 with two openings 7 and 8, which are geometrically shaped as triangles with a view to accommodation by the triangle-like, extracted punchings/cams as explained above with reference to FIG. 1.

The two openings 7 and 8 are executed in two side faces 14 and 15 opposing each other. The anchoring piece shown in FIG. 2 is manufactured, so that its end faces 9, shown in the left side of the figure, can be inserted into a column adapted thereto and provided with internal cams that can enter into locking engagement with the two openings 7 and 8.

Between the left side of the opening 8 and the end faces 9, it is indicated that the opening 8 has a distance D from the end faces 9. This also applies to the opening 7, which (usually but not necessarily) has the same distance D from the end faces 9.

FIG. 3 shows an anchoring piece executed as an embodiment of the invention shown in a side view.

Here, in the sectional view at the bottom of FIG. 3, it is clear how the opening 7, as the opening 8, is arranged at the distance D from the end faces 9. The underlying idea of this embodiment is that this anchoring piece is to be inserted into a column with an internal stopping device and a cam, arranged so that the stopping device prevents further insertion of the anchoring piece. When this happens, the cam (the semi-cutout) snaps into locking engagement with an opening in the anchoring piece.

Figure 4:
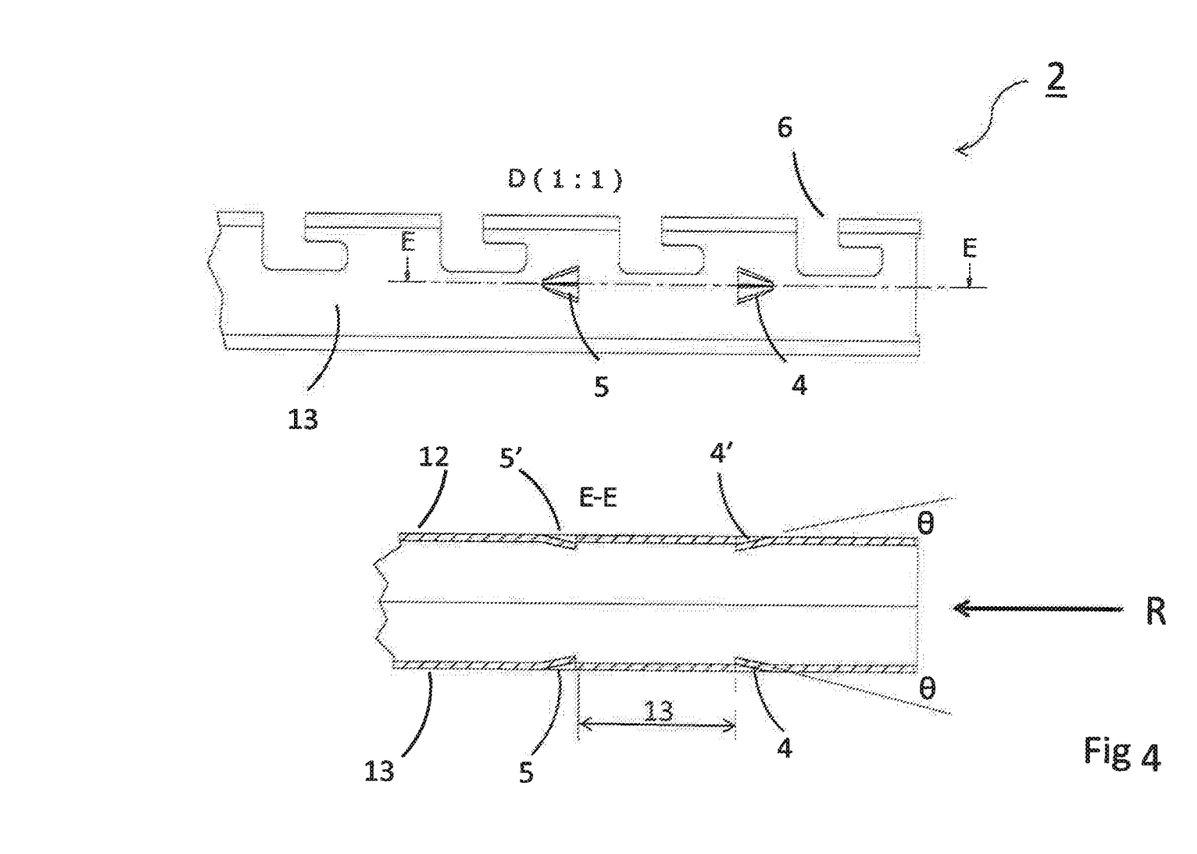
FIG. 4 shows a side view of the magnification of section D of a column and a sectional view hereof.

Such stopping device and cam are shown in FIG. 4.

FIG. 4 shows a side view of a column 2 according to the invention as well as a sectional view of a column 2 according to the invention. As appears from the top image in FIG. 4, showing a side view of the column piece, the column, in addition to slits 6 for suspension of shelves, has two punchings 4 and 5.

At the bottom of the two images shown in FIG. 4, there is a sectional view E-E of the column, and this sectional view shows that the columns, according to this embodiment of the invention, can comprise four punchings 4, 5, 4', 5', and that they are executed symmetrically about the longitudinal axis of the column, so that the punchings 4 and 5 lie opposite the punchings 4' and 5'.

At the bottom image, the distance between the two punchings 4 and 5 is denoted D'', and this distance is usually also the distance between the opposite punchings 4' and 5'. When an anchoring piece, as shown in FIGS. 2 and 3, is inserted with the end faces 9 first in direction R, as shown in FIG. 4, the end faces 9 of the anchoring piece will pass the first two punchings 4 and 4', which will thereby be pressed against the outer sides of the column. Subsequently, the end faces 9 will reach the other two punchings 5 and 5', which will prevent further insertion of the anchoring piece.

As also appears from FIG. 4, the punchings 4 and 4' incline slightly at an angle θ relative to the side faces. By executing the punchings 4 and 4' as slightly angled relative to the side faces, it is achieved that an anchoring piece can be inserted in the column in direction R and past punchings 4 and 4', as these will be pressed against the outer side of the column at a force, which—due to the small angle θ—is usually reinforced relative to the insertion force. It will be evident to the skilled person that his reinforcement is obtained due to the inclination of the punchings as explained above, and it will therefore also be evident to the skilled person that the angle θ can be varied depending on the desired strength of the outwardly pressing force.

As the punchings 4 and 4'—as explained above—are constructed with a view to obtaining large rigidity (large surface moment of inertia), this outwardly pressing force will cause a deformation of the column's side walls 12 and 13, but it will of course also cause a deformation of the anchoring piece's side walls (14 and 15 as shown in FIG. 2). However, in relative terms the deformation of the punchings (the semi-cutout) themselves will not be so large that this has implications for the insertion.

The actual advancement of the anchoring piece will be able to continue until the end faces 9 reach the opposing punchings 5 and 5', which function as stopping devices.

The distance D'' between the punchings, shown in FIG. 4, is substantially the same as the distance D between the anchoring piece's end faces 9 and the opening 8, shown in FIG. 2. This means that the openings 7 and 8 will be flush with punchings 4 and 4', when the end faces meet the stopping devices in the form of the opposing punchings 5 and 5', and therefore the punchings 4 and 4' (during release of the elastic forces that are accommodated in the side walls 12,13,14,15) will snap into the openings 7 and 8.

Figure 6:
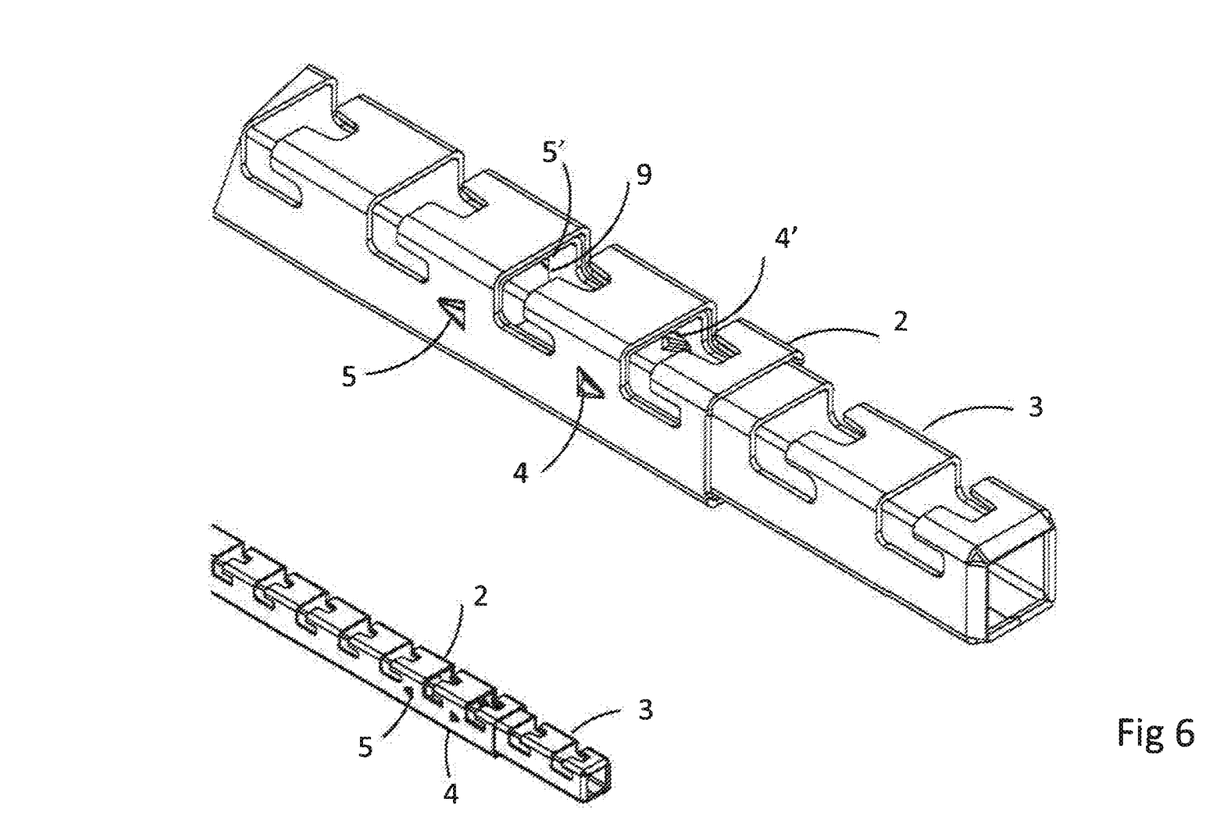
FIG. 6 shows a perspective view of a column assembled with an anchoring piece and a magnified section of a column with an anchoring piece.

When this happens, as shown in FIGS. 1 and 6, the anchoring piece will be locked in the column.

By executing the two stopping devices 5 and 5' as inversions of the punchings 4 and 4', it is obtained that the geometric shape of these could be used for both generating an outward force and for blocking/stopping the anchoring piece from further insertion into the column.

In terms of production, this is also an advantage as it will be possible to make the indentations 4, 4', 5 and 5' with the same tool.

Even though the locking parts in the shown figures are illustrated as triangle-shaped punchings, it will be evident to the skilled person that the locking between the column and the anchoring piece can be obtained in other ways, e.g. with spherical projections and openings adapted thereto, but the triangle-like shape has turned out to have advantages.

It will also be evident to the skilled person that locking parts can be executed, so that the triangle-like projections are not formed in the outermost object (the column itself), but are formed in the innermost object (the anchoring piece).

However, it has turned out that this particular embodiment has advantages in the assembly of the load carrier's columns and anchoring parts. The reason is that load carriers are often exposed to bumps, and the geometric locking-in that takes place, when the punchings 4 and 4' snap inwards in the openings 7 and 8 against the central axis of the column means that the locking-in is not released at the usually occurring elastic deformations that take place, when the load carriers inevitably and often are exposed to external bumps.

Figure 7:
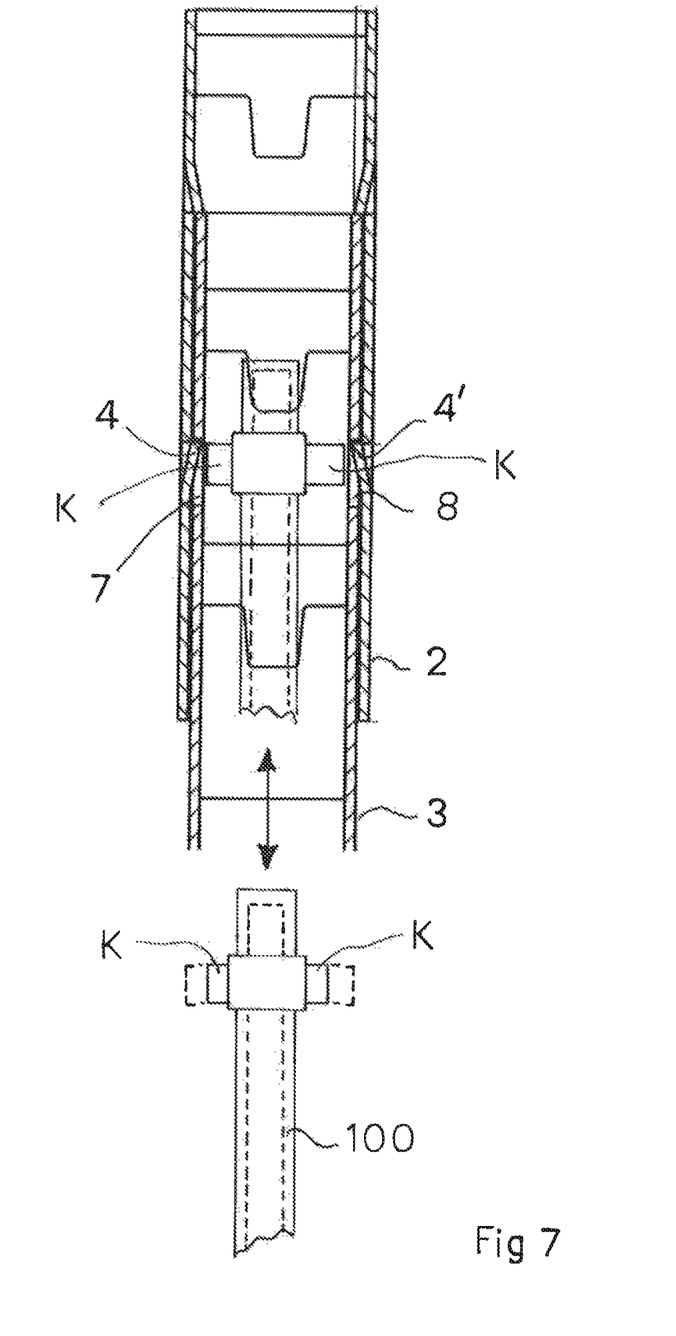
FIG. 7 shows an exemplary embodiment of a device to separate a column and an anchoring piece.

FIG. 7 shows an apparatus for separation of a column from an anchoring piece. The apparatus comprises a grip 100 with two transverse pistons K that can be injected and ejected in a direction perpendicular to the grip 100. The dismounting takes place by first inserting the apparatus in the anchoring piece until the pistons are located on a level with the two locking cams 4 and 4'. Subsequently, the pistons K are activated, so that they are ejected and thereby press the two cams 4 and 4' out of engagement with the openings 7 and 8 of the anchoring piece. Then the anchoring piece can be pulled out of the column by means of the pistons K.

Figure 8:
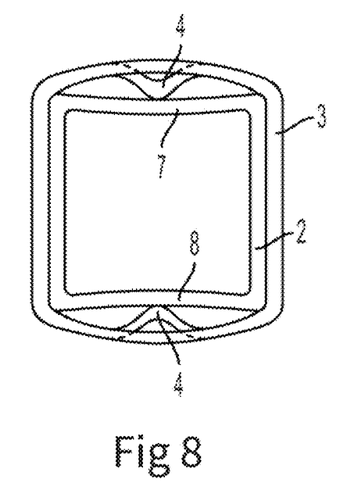
FIG. 8 shows a cross-sectional top view of a column being slid into an anchoring piece.

FIG. 8 illustrates a column 2 deforming elastically as it slides into an anchoring piece 3.

Figure 9:
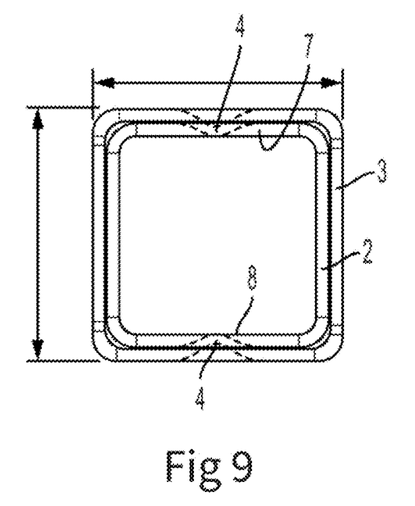
FIG. 9 shows a cross-sectional top view of a column locked in place in an anchoring piece.

FIG. 9 illustrates a column 2 in its final locked position in an anchoring piece 3, wherein two opposite punchings 4 are aligned with two mating opposite openings 7,8. When aligned, the punchings 4 are received by, and snap into place in, the openings 7, 8. This returns the column 2 to its original undeformed state and locks the column 2 against relative movement within the anchoring piece 3.

The invention claimed is:

1. A coupling system for coupling units on a substantially rectangular load carrier, the load carrier having four corners, the coupling system comprising:
   a column having a longitudinal axis, a rectangular profile, and four column side faces;
   an anchoring piece having a longitudinal axis, a rectangular cross section, and four anchoring piece side faces, wherein the anchoring piece is configured for arrangement on one of the corners of the load carrier,
wherein the anchoring piece and the column are configured for mutual sliding engagement along the longitudinal axes thereof such that one of the anchoring piece and the column forms an exterior telescoping piece and the other of the anchoring piece and the column forms an interior telescoping piece, and wherein a first anchoring piece side face has either at least one cam or at least one opening and a first column side face has the other of the at least one cam or at least one opening, and the first anchoring piece side face and the first column side face are configured for locking engagement, the at least one opening and the at least one cam having mutually adapted locations and configurations such that the at least one opening and the at least one cam engage when the column and the anchoring piece are slidingly engaged, wherein the at least one cam comprises a semi-cutout punching having two bent faces that project or extend radially inward and meet at a ridge, wherein the two bent faces are partly strain-hardened to form an inflexible part, and wherein the punching has a cutout opening formed at an end of the two bent faces.

2. The system of claim 1, wherein the at least one cam is provided on an inner side of the exterior telescoping piece and the at least one opening is provided on the interior telescoping piece.

3. The system of claim 1, wherein the column has a perimeter and the anchoring piece has a perimeter, and wherein the perimeter of the column is larger than the perimeter of the anchoring piece, such that an inner side of the column slides on an outer side of the anchoring piece, when the column and the anchoring piece are engaged.

4. The system of claim 3, wherein the at least one cam is provided on an inner side of the column.

5. The system of claim 1, wherein the at least one cam comprises a first two cams, wherein the first two cams are provided on the first column side face, and wherein the first two cams are displaced along the longitudinal axis of the column.

6. The system of claim 5, wherein the first two cams are provided on an inner side of the first column side face, the first two cams being mutually displaced along the longitudinal axis of the column.

7. The system of claim 5, further comprising a second two cams, wherein the second two cams are provided on a second column side face, wherein the second column side face is opposite the first column side face.

8. The system of claim 5, wherein the at least one opening comprises a first two openings and wherein the first two openings are provided on the first anchoring piece side face and arranged for locking engagement with the first two cams.

9. The system of claim 5, further comprising a second two cams, wherein the second two cams are provided on a second column side face, wherein the first two cams and the second two cams are arranged symmetrically about the longitudinal axis of the column such that first two cams face the second two cams, wherein the second two cams function as a stopping device and the first two cams function to lockingly engage with the at least one opening of the anchoring piece.

10. The system of claim 9, wherein each of the cams are provided by a respective column side face being deformed/extended to a triangular construction at an angle between 1 and 10 or 1 and 15 or 1 and 25 or 5 and 25 degrees relative to the column side face.

11. The system of claim 9, wherein the second two cams functioning as stopping devices are reflections of the first two cams functioning to lockingly engage with the at least one opening of the anchoring piece.

12. The system of claim 1, wherein a second anchoring piece side face has a second cam or a second opening, the second anchoring piece side face being opposite the first anchoring piece side face, and wherein a second column side face has the other of the second cam or second opening, the second column side face being opposite the first column side face.

13. The system of claim 12, wherein the cams and the openings are arranged symmetrically about the longitudinal axis of the anchoring piece and the longitudinal axis of the column.

14. A load carrier comprising a coupling system, wherein the coupling system comprises:
   a column having a longitudinal axis, a rectangular profile, and four column side faces;
   an anchoring piece having a longitudinal axis, a rectangular cross section, and four anchoring piece side faces, wherein the anchoring piece is configured for arrangement on a corner of the load carrier,
wherein the anchoring piece and the column are configured for mutual sliding engagement along the longitudinal axes thereof such that one of the anchoring piece and the column forms an exterior telescoping piece and the other of the anchoring piece and the column forms an interior telescoping piece, and wherein a first anchoring piece side face has either a first cam or a first opening and a first column side face has the other of the the first cam or the first opening and the first anchoring piece side face and the first column side face are configured for locking engagement, the opening and the cam having mutually adapted locations and configurations such that the opening and the cam engage when the column and the anchoring piece are slidingly engaged, wherein the first cam comprises a semi-cutout punching having two bent faces that project or extend radially inward and meet at a ridge, wherein the two bent faces are partly strain-hardened to form an inflexible part, and wherein the punching has a cutout opening formed at an end of the two bent faces.

15. A coupling system for coupling units on a substantially rectangular load carrier, the load carrier having four corners, the coupling system comprising:
   a column having a longitudinal axis, a rectangular profile, and four column side faces;
   an anchoring piece having a longitudinal axis, a rectangular cross section, and four anchoring piece side faces, wherein the anchoring piece is configured for arrangement on one of the corners of the load carrier,
wherein the anchoring piece and the column are configured for mutual sliding engagement along the longitudinal axes thereof such that one of the anchoring piece and the column forms an exterior telescoping piece and the other of the anchoring piece and the column forms an interior telescoping piece, and wherein a first anchoring piece side face has either at least one cam or at least one opening and a first column side face has the other of the at least one cam or at least one opening, and the first anchoring piece side face and the first column side face are configured for locking engagement, the at least one opening and the at least one cam having mutually adapted locations and configurations such that the at least one opening and the at least one cam engage when the column and the anchoring piece are slidingly engaged, wherein the at least one cam comprises a semi-cutout punching having two bent faces, and wherein at least one of the first column side face or the first anchoring piece side face is sufficiently elastically deformable to accommodate the punchings when the column is slid into the anchoring piece.

* * * * *